(12) United States Patent
Albers et al.

(10) Patent No.: US 9,447,618 B2
(45) Date of Patent: Sep. 20, 2016

(54) CONTAINER LOCK

(71) Applicant: JOST-WERKE GMBH, Neu-Isenburg (DE)

(72) Inventors: Stephan Albers, Pr. Oldendorf (DE); Hans-Peter Paulekuhn, Bad Arolsen (DE); Michael Eiermann, Pfungstadt (DE); José Manuel Algüera, Aschaffenburg (DE)

(73) Assignee: JOST-WERKE GMBH, Neu-Isenburg (DE)

( * ) Notice: Subject to any disclaimer, the term of this patent is extended or adjusted under 35 U.S.C. 154(b) by 534 days.

(21) Appl. No.: 13/950,358

(22) Filed: Jul. 25, 2013

(65) Prior Publication Data
US 2014/0028034 A1    Jan. 30, 2014

(30) Foreign Application Priority Data
Jul. 25, 2012  (DE) .......................... 10 2012 213 104

(51) Int. Cl.
| | | |
|---|---|---|
| *B60P 7/08* | (2006.01) | |
| *B60P 7/13* | (2006.01) | |
| *E05C 19/12* | (2006.01) | |
| *E05B 9/00* | (2006.01) | |

(52) U.S. Cl.
CPC ................ *E05C 19/12* (2013.01); *B60P 7/132* (2013.01); *E05B 9/00* (2013.01)

(58) Field of Classification Search
CPC ............. B60P 7/132; B60P 7/13; B60P 3/40; B60P 1/6418; B60P 1/6481; B60P 7/08; B60P 7/0815; B60P 1/16; B62D 53/067; B62D 53/0828; B62D 24/02; B62D 31/025; B62D 33/10; B62D 53/06; B62D 53/061
USPC ............ 410/82, 70, 69, 73, 76, 80; 292/109, 292/121; 248/681, 500, 503
See application file for complete search history.

(56) References Cited

U.S. PATENT DOCUMENTS

| | | | | |
|---|---|---|---|---|
| 5,570,981 A | * | 11/1996 | Brewster .............. | B61D 45/007 410/69 |
| 5,613,814 A | * | 3/1997 | Jackson ................... | B60P 7/13 410/69 |
| 7,114,898 B2 | * | 10/2006 | Brewster ................. | B60P 7/132 410/69 |
| 7,637,704 B2 | * | 12/2009 | Morin .................. | B61D 45/007 410/69 |

FOREIGN PATENT DOCUMENTS

| | | |
|---|---|---|
| DE | 102006002654 A1 | 8/2007 |
| DE | 20 2009 016 268 U1 | 4/2010 |
| DE | 202011050490 U1 | 8/2011 |
| DE | 20 2010 005 717 U1 | 11/2011 |

* cited by examiner

*Primary Examiner* — Glenn Dayoan
*Assistant Examiner* — Sunsurraye Westbrook
(74) *Attorney, Agent, or Firm* — Hudak, Shunk & Farine Co. LPA

(57) ABSTRACT

A locking device for containers with a container lock housing and with a locking hook. The locking hook has a pivot axis, which is stationary relative to the container lock housing and which can pivot about the locking hook into a standby position and a locking position. An activation mechanism is included for the locking hook, which has a first actuating element and a second actuating element as well as a release mechanism. The first actuating element holds the locking hook in its standby position, while the second actuating element is configured such that it blocks and clamps the locking hook in its locking position. The release mechanism after the releasing acts on the first actuating element and/or on the second actuating element, which automatically brings about the clamping and blocking of the locking hook in its locking position by the second actuating element.

24 Claims, 13 Drawing Sheets

CONTAINER LOCK

FIELD OF THE INVENTION

The invention concerns a locking device for containers with a container lock housing and with a locking hook that has a hook body, a hook element, and a pivot axis, which is stationary relative to the housing and about the pivot axis the locking hook can swivel into a standby position and a locking position, and with an activating mechanism for the locking hook; a container lock box; and an arrangement of locking devices.

BACKGROUND OF THE INVENTION

The transport of containers occurs sometimes by highway vehicles on which the containers must be fastened in a simple and secure way. The vehicles therefore have suitable locking devices that work together with the corner fittings of the containers.

Commonly used are so-called twist-locks which have a locking pin and a mushroom-shaped head. This locking pin is introduced into the corner fitting, twisted, and clamped in this locking position. Such a locking device is known, for example, from DE 20 2009 016 268 U1. Such devices have the drawback that they need to be operated by hand.

DE 20 2010 005 717 U1 discloses a locking device which enables an automatic locking during loading with blocking of the locked position and a semiautomatic unloading in that a blocking means is released before the unloading process. The device has one or in particular two locking levers that can swivel in a scissors arrangement in opposite directions about a common axis that wanders in the vertical direction. Beneath the axis, the lower legs of the locking levers are bent relative to the upper leg, and a bent lever is pivoted by a hinge on the lower legs. The bent levers are able to swivel on a fixed point in the housing of the locking device. Moreover, a blocking means in the form of a sliding bar is arranged in the housing of the locking device, which is loaded by springs in the direction of its locking position. By pressing down on a release when the container is put in place, the locking of the bar is released, so that it shoots out due to the tensioned compression springs and hinders the common axis of the scissors hinge in its vertical movement and thus blocks it.

This device has the drawback that the bent lever and scissors mechanism is cumbersome and thus costly to manufacture and prone to malfunction. Furthermore, the locking levers are only blocked in the locking position, but not clamped, so that the corner fittings can shake during operation and a firm seating of the container cannot be assured.

In order to solve this problem for such hooklike locking devices, it has already been proposed to provide only a single locking hook and to configure this hook as a lever of the first kind, which can swivel about a stationary pivot axis in the housing. By means of a spindle, which engages with the lower end of the locking hook, the locking hook can be placed in its locking position by means of tools and by hand and, once engaging with the corner fitting, it can also be pressed down against the corner fitting. This device has the drawback that the device does not fall automatically into its locking position and the turning of the spindle to the locking, clamping and unlocking of the hook is time consuming.

The problem of the invention is to provide a container locking device that has an easy construction, locks automatically, and ensures a firm seating of the container.

SUMMARY OF THE INVENTION

This problem is solved with a locking device for containers, comprising: a container lock housing and with a locking hook that has a hook body, a hook element, and a pivot axis, which is stationary relative to the housing and about the pivot axis the locking hook can swivel into a standby position and a locking position, and with an activating mechanism for the locking hook, wherein the activating mechanism has a first actuating element, a second actuating element, and a releasing mechanism, wherein the first actuating element holds the locking hook in its standby position and the second actuating element is configured so that it blocks and clamps the locking hook in its locking position, and wherein the releasing mechanism after the releasing acts on the first actuating element and/or on the second actuating element, which automatically brings about the clamping and blocking of the locking hook in its locking position by the second actuating element.

The invention starts from a locking hook that has a hook body, a hook element, and a pivot axis and that can swivel about an axis which is stationary relative to a container lock housing into a standby position and a locking position. A single locking hook enables a simple construction and a simple arrangement in the housing of the locking device.

This locking hook can have one, two, or several pieces. In the multipart version, two or more narrow parts are formed as locking hooks, i.e., locking hooks with a smaller width. The overall width of the parts preferably corresponds to the width of a one-piece locking hook. In the multipart version, the hook elements of the individual parts of the locking hook point in the same direction and the parts of the locking hook are swiveled jointly about the same stationary pivot axis in the same direction.

This multipart design of the locking hook has benefits in its fabrication, as costs can be reduced. Furthermore, the risk of complete loss of function due to parts failure is reduced thanks to the redundant design of the locking hook.

The activating mechanism comprises the parts needed to activate the locking hook, such as blocking, releasing, and so on. The activating mechanism has a first actuating element, a second actuating element, and a releasing mechanism.

The providing of two separate actuating elements and their assignment to the standby position of the locking hook on the one hand and the locking position of the locking hook on the other hand has the benefit that the actuating elements can be individually adapted to the different tasks.

The first actuating element is configured so that it holds the locking hook in its standby position. This holding can also involve a blocking in the standby position in the sense of an immovable fixation.

With one locking hook, which drops from its standby position into its locking position by gravity due to the arrangement of its center of gravity, it is enough for the first actuating element to oppose the force of gravity and prevent an unwanted swiveling into the locking position.

The second actuating element is configured so that it not only blocks, but also clamps the locking hook in its locking position. This prevents knocking noises that result from a loose seating of the container on the locking device and ensures a firm seating of the container.

The release mechanism can advantageously be activated by the container. The release mechanism is triggered when the container is set down on the loading surface, especially by the respective container fittings, so that the blocking and clamping of the locking hook occurs automatically, i.e., without manual intervention, thanks to the interaction of the release mechanism with the first actuating element and/or the second actuating element.

According to a first design variant, the release mechanism can engage with the first actuating element. In this case, the first actuating element acts preferably on the second actuating element or the first actuating element is preferably coupled to the second actuating element or arranged on it.

According to a second design variant, the release mechanism can engage with the second actuating element. In this case, the second actuating element preferably acts on the first actuating element or the second actuating element is preferably coupled to the first actuating element or arranged on it.

The first and second actuating element are preferably coupled to each other by a connection element.

According to a third variant, the first and second actuating element are able to move totally independently of each other. In this case, the release mechanism preferably acts on both actuating elements.

The first actuating element preferably has its own first spring mechanism, so that the first actuating element is spring-loaded when it is in the position in which the first actuating element holds the locking hook in its standby position.

The actuating elements or the forces acting on them can also be matched to each other such that, when the release mechanism is activated, the second actuating element works against the force of the spring mechanism of the first actuating element and subsequently cancels its action on the locking hook.

The releasing of the release mechanism has the effect that the first actuating element automatically released the standby position of the locking hook, so that it can move into its locking position. The first actuating element is therefore preferably able to move into a releasing and a retaining position, and in its retaining position it holds the hook in the standby position. The automatic moving of the first actuating element from its retaining position depends on whether or not, say, a coupling is provided with the second actuating element.

Preferably, the first actuating element is coupled on the second actuating element, in particular, arranged so that an automatic moving of the second actuating element also results in an automatic moving of the first actuating element.

The first actuating element is preferably a spring element. This has the advantage that the locking hook is clamped in its standby position and thus, for example, a free play or wobbling of the locking hook is prevented.

The second actuating element can preferably move into a resting position and a blocking position. In order to bring about an automatic sequence, preferably a second spring mechanism is provided, which pulls the second actuating element into its clamping position after the releasing of the release mechanism, in which the second actuating element blocks and clamps the locking hook in its locking position.

The releasing of the locking hook occurs semiautomatically, preferably by means of a manipulation mechanism, which shall be described below.

Preferably the locking hook is a lever whose pivot axis is arranged at a first end of the level, while the hook element is arranged at a second end of the lever. The force relations of such a locking lever are more favorable than for a lever of the first kind in which the pivot axis is arranged between the ends of the lever. Another advantage is that the pivot axis can be placed lower in the housing, which opens up more possibilities for accommodating the swivel support. The swivel support is preferably arranged in the housing on a wall, preferably the swivel support is provided on the rear wall of the housing.

Preferably the locking hook has an activating means between the first and the second end. This arrangement has the advantage that both actuating elements can engage with the activating means. In the standby position of the locking hook, the first actuating element engages preferably at the underside of the activating means and in the blocking position of the locking hook the second actuating element preferably engages on the top side of the activating means.

Preferably the activating means is a rodlike element that is arranged parallel to the pivot axis.

The rodlike element can be an integral part of the hook body. It is also possible for the rodlike element to be screwed onto the hook body.

One preferred embodiment of the lever has the hook body with legs arranged at an angle, the hook element being disposed at the free end of the first leg and the pivot axis at the free end of the second leg. Preferably the activating means is arranged in the junction region of the legs.

This bent configuration of the lever not only has the advantage that the lever forces can be optimized, but also the advantage that both the location of the pivot axis and the location of the activating means inside the housing can be adapted and optimized to the space conditions inside the housing.

Preferably the locking hook drops into the locking position by gravity in the installed position of the housing. Since the locking lever is a lever with pivot axis at the end of the lever, the distance of the center of gravity from the pivot axis is great, so that in the standby position only a slight tilting of the locking hook from the vertical, as regards the line of connection, is necessary for the locking hook to drop by gravity and thus automatically into its blocking position upon releasing of the standby position by means of the first actuating element.

It may possibly be of advantage for the locking hook to be spring-loaded in its standby position by means of a spring mechanism, preferably. The swivel movement to the locking position can be supported or even be brought about entirely in this way. This can be of advantage when the locking device is oriented at a slant, due to a slanting position of the loading surface on which the locking device is placed, so that additional forces are required for the locking hook to drop into its locking position.

Preferably, the second actuating element has a cam surface, which engages directly or indirectly with the locking hook and blocks and clamps the locking hook.

A cam surface can be a curved surface, having a predetermined radius, for example, or being a free form surface. A cam surface can also be a surface with two or more flat surface segments. A cam surface can also be a combination of at least one curved surface and at least one flat surface.

Preferably the cam surface has at least one segment for the power-locked clamping and blocking of the locking hook.

This segment is preferably a bevel, which upon a translatory movement of the second actuating element runs across the activating means of the locking hook and with increasing forward motion pushes the activating means and thus the locking hook increasingly down into the installed position of the locking device, for example, which brings about a clamping of the fitting and thus the container—if the hook is already bearing against the fitting.

This segment in the case of a different movement sequence of the second actuating element, such as a rotary movement, can be appropriately configured differently.

The segment of the cam surface is preferably configured so that the force on the activating means increases upon continuing movement of the second actuating element into its blocking position.

Preferably, the cam surface has at least one segment for the form-fitted blocking of the locking hook. This segment is preferably arranged before the segment for blocking and clamping in the direction of movement of the second actuating element, so that if the clamping should be unintentionally released, a blocking of the locking hook will still be assured.

Preferably the second actuating element is a bar which can travel by translatory motion into a resting and a blocking position. The translatory movement enables a simple configuration of the segments for blocking and clamping and for blocking. These segments can be configured as straight or flat surfaces.

Preferably the bar is a wedge.

Preferably two bars are disposed alongside each other and connected to each other by a connection element. This embodiment of the second actuating element has the advantage that total failure will not result if one bar fails or if one bar is not optimally clamped.

Preferably a guide mechanism is provided in the housing, in which the second actuating element is movably mounted.

The second actuating element is pretensioned in the resting position, preferably by means of a second spring mechanism.

Preferably the second actuating element can be detained in a first resting position by means of a detent element. After the releasing of the releasing mechanism, this detaining is released and the second actuating element is moved by means of the second spring mechanism into the blocking position. The force of the spring mechanism is preferably adjusted so that a sufficient clamping by the curve surface is made possible. The spring mechanism and the cam surface are accordingly attuned to each other.

Preferably the detent element can be activated by the release mechanism to release the second actuating element.

According to another embodiment, the second actuating element is held in a second position of rest by means of a ratchet. The ratchet will be used if an unlocking is done by means of the manipulation mechanism but the container has not yet been removed from the locking device. This will be explained more closely together with the manipulation mechanism.

Preferably the ratchet is swiveled and drops by gravity or spring loading into its blocking position. The ratchet is preferably swiveled stationary to the housing.

In its blocking position, the ratchet preferably engages with a recess of the second actuating element.

Preferably the ratchet can be moved manually and accessible from the outside into the unlocking position. When the second actuating element is moved manually into its position of rest, so that the locking hook is in its standby position, but the container has not yet been removed, the release mechanism remains in the released state. If this unlocking needs to be reversed, it is necessary to move the ratchet manually to its release position. After this, the second actuating element can be moved by means of the second spring mechanism into its blocking position.

Preferably the ratchet can be activated via the release mechanism. When the release mechanism is moved into the releasing state, the ratchet will be moved into its releasing position.

Preferably a manipulation mechanism is provided for the first actuating element and/or the second actuating element, and the manipulation mechanism is preferably provided with a third spring mechanism. The unlocking of the locking hook is done by means of the manipulation mechanism, being preferably semiautomatic. By using the manipulation mechanism, which is manually pulled from its position of rest into an unlocking position, the second actuating element is preferably moved from the blocking position to the position of rest, so that the locking hook is moved automatically into the standby position. The second actuating element is fixed in its position of rest. After this, the manipulation mechanism is pulled back automatically by the third spring mechanism to its position of rest.

The manipulation mechanism can be displaced preferably parallel to the top wall of the housing. Preferably the manipulation mechanism has at least one guide track or slide, by means of which it is movably mounted on the second actuating element, the end of the guide track forming an abutment to drive along the second actuating element.

Preferably the third spring mechanism holds the manipulation mechanism in its position of rest.

Preferably the release mechanism has a release pin. For this, an opening for the release pin is preferably provided in one wall of the housing. The release pin can move into a disengaged release position and an engaged position.

The release pin is pretensioned in its release position by means of a first spring device.

When the container is placed on the locking device, the release pin is moved against the force of the spring, and the releasing process occurs.

Preferably a lock indicator mechanism is provided on one wall of the housing, which tells the user whether or not the locking hook is engaged.

The lock indicator mechanism preferably comprises a pretensioned pin, which extends to the outside through a housing wall.

The lock indicator mechanism is preferably activated directly or indirectly by the first or the second actuating element.

Preferably two projecting guide elements flanking the locking hook are arranged on the top wall of the housing. This facilitates the inserting of a container into the fitting and protects the locking hook against damage. The guide elements preferably project beyond the locking hook.

The spring elements can preferably be joined to each other at their free end across a bridge. The bridge is preferably conical or pyramidal in shape, which facilitates the introducing into the opening of the fitting.

Preferably the activating mechanism is arranged in a box, which can be inserted into the housing. Thanks to the box, the entire activating mechanism can be taken out. Only the locking hook and possibly the lock indicator mechanism are still arranged in the housing. Maintenance and repair work on the activating mechanism can thus be done easily on the box taken out from the housing.

The container lock housing which accommodates a container lock box with at least one top wall, two side walls and a back wall, and with a locking hook extending through the top wall, which has a hook body, a hook element and a pivot axis that is stationary relative to the housing and about which the locking hook can swivel into a standby position and a locking position, is characterized in that the pivot axis of the locking hook is disposed parallel to the top wall and a swivel support is provided on one housing wall for the swiveled mounting of the locking hook.

The container lock box for use in a container lock housing is characterized in that it has a mounting plate, on which three subassemblies are arranged, forming an activation mechanism for a locking hook, wherein a first subassembly has a release mechanism with a first spring mechanism, wherein a second subassembly has a first actuating element and a second actuating element able to move in parallel with the mounting plate with a second spring mechanism, and wherein a third subassembly has a manipulation mechanism for the first and/or second actuating element with a third spring mechanism.

An arrangement of locking devices on a container loading surface calls for arranging the locking device at the edge of the loading surface, forming opposite pairs, and the hook elements of each pair of devices point in opposite directions.

This arrangement has the benefits that the position of the respective hook can be recognized by the driver from the outside when the container has been loaded and the centrifugal forces acting on the container when negotiating a curve can be better absorbed.

BRIEF DESCRIPTION OF THE DRAWINGS

Sample embodiments of the invention shall be explained more closely below by means of the drawings.

There are shown.

DETAILED DESCRIPTION OF THE INVENTION

Figure 1:
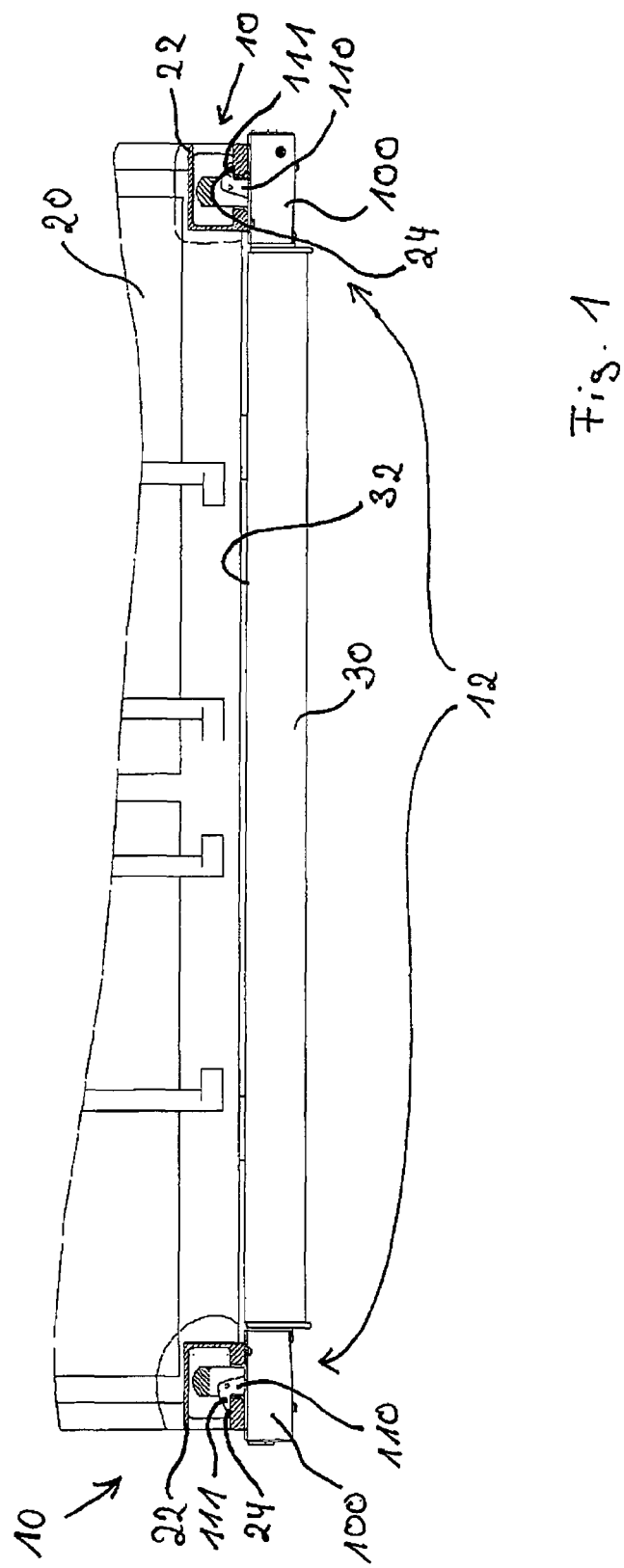
FIG. 1 a partial view of the back side of a trailer with container set on it, FIG. 2 a locking device in perspective representation according to a first embodiment, FIG. 3 The locking device shown in FIG. 2 in the assembled state, FIG. 4 a perspective representation of a locking hook, FIG. 5 the bottom view of a housing of a locking device with locking hook, FIG. 6 the bottom view of a box, FIG. 7a a perspective representation of a first subassembly, FIG. 7b a side view of a first subassembly, FIG. 8a a perspective representation of a second subassembly, FIG. 8b perspective representation of a second actuating element, FIG. 9 a perspective representation of a third subassembly, FIG. 10 a side view of a locking device in the standby position, FIG. 11 another side view of a locking device when the release mechanism is activated, FIG. 12 a side view of a locking device in an intermediate position, FIG. 13 a perspective representation of a locking device in the locking position, FIG. 14 a side view of a locking device being unlocked, FIG. 15 a side view of a locking device after being unlocked, FIG. 16 a perspective representation of a locking device being unlocked, and FIG. 17 a magnified view of detail X from FIG. 16 looking at the ratchet.

FIG. 1 shows a partial view of the back side of a semi trailer 30 with a container 20 placed on a loading surface 32, the corner fittings 22 of the container 20 being shown in sectional view.

The two locking devices 10 mounted opposite each other on the trailer 30 form a pair of locking devices 12. Each locking device 10 has a container lock housing 100 with a locking hook 110. In the container lock housing 100 is arranged an activation mechanism 210 for the locking hook 110, which shall be explained more closely in connection with the other figures.

The locking hooks 110 engage with the respective corner fittings 22, whereupon the hook elements 111 press against the locking surface 24 of the bottom 23 of the corner fitting 22. Thanks to the clamping of the locking hook 110, the container 20 is held firmly and free of vertical play.

The locking devices 10 are arranged so that the hook elements 111 of the locking device pair 12 each point outwards and thus in opposite directions. The arrangement shown has the benefit that the position of the respective hook when the container has been loaded can be recognized by the driver from the outside and centrifugal forces acting on the container when negotiating a curve can be better absorbed.

If is also possible for both hook elements of a pair 12 to be disposed pointing inwards.

The locking device 10 shall be explained individually by means of a first sample embodiment—so-called box variant—in FIGS. 2 to 17, which consists of two components, namely, the container lock housing 100 with the locking hook 110 and the container lock box 200, which contains the overall activation mechanism 210 for the locking hook 110. This container lock box 200 is designed as a slide-in part, which can be shoved as a preassembled unit like a drawer into the container lock housing 100 of the locking device 10. The container lock box 200 can be removed by pulling it out from the container lock housing 100.

The container lock housing 100 has a top wall 102, two side walls 104, 106, a back wall 108 and a bottom wall 109. The mentioned walls need not be completely closed. In the side wall 104 is arranged a lock indicator mechanism 160, which reports the locked state of the locking hook 110. This device 160 comprises a pin 164, which projects to the outside through an opening 162 in the side wall 104 in the unlocked state. In the locked state, the pin 164 is withdrawn and flush with the side wall 104.

The top wall 102 has an opening 170 through which the locking hook 110 extends upward. In the embodiment shown here, the locking hook 110 consists of two parts 110'. Accordingly, the locking hook 110 has a hook element 111 that consists of two hook element parts 111'.

The locking hook 110 is flanked on its sides by two projecting guide elements 152, 154, which facilitate its introduction in the corner fitting 22. The two guide elements 152, 154 are joined to each other by a bridge 156, which is rounded in configuration and likewise facilitates the introducing into the corner fitting 22 of the container 10. At the same time, the bridge 156 protects the locking hook 110 against damage when being introduced into the corner fitting 22.

The container lock box 200 has a mounting plate 202, on which the different subassemblies 220, 250, 330 of the activation mechanism 210 for the locking hook 110 are secured.

On the mounting plate 202 is fastened a front plate 204. The handle 350 shown on the front plate 204 belongs to the manipulation mechanism 332 for the second actuating element 260, which will be discussed more closely in connection with the other drawings.

The second alternative embodiment, which calls for the activation mechanism 210 to be mounted in the container lock housing 100, differs from the box design (first alternative embodiment) in that no mounting plate 202 is provided and the activation mechanism 210 is mounted on the housing walls. The front plate 204 in this case forms a forward wall of the container lock housing 100 and is mounted, e.g., on the housing walls 104, 106.

The remarks regarding the activation mechanism 210, the components of the activation mechanism 210 and the functioning of the activation mechanism 210 in connection with the locking hook 110 apply equally to both alternative embodiments.

Figure 2:
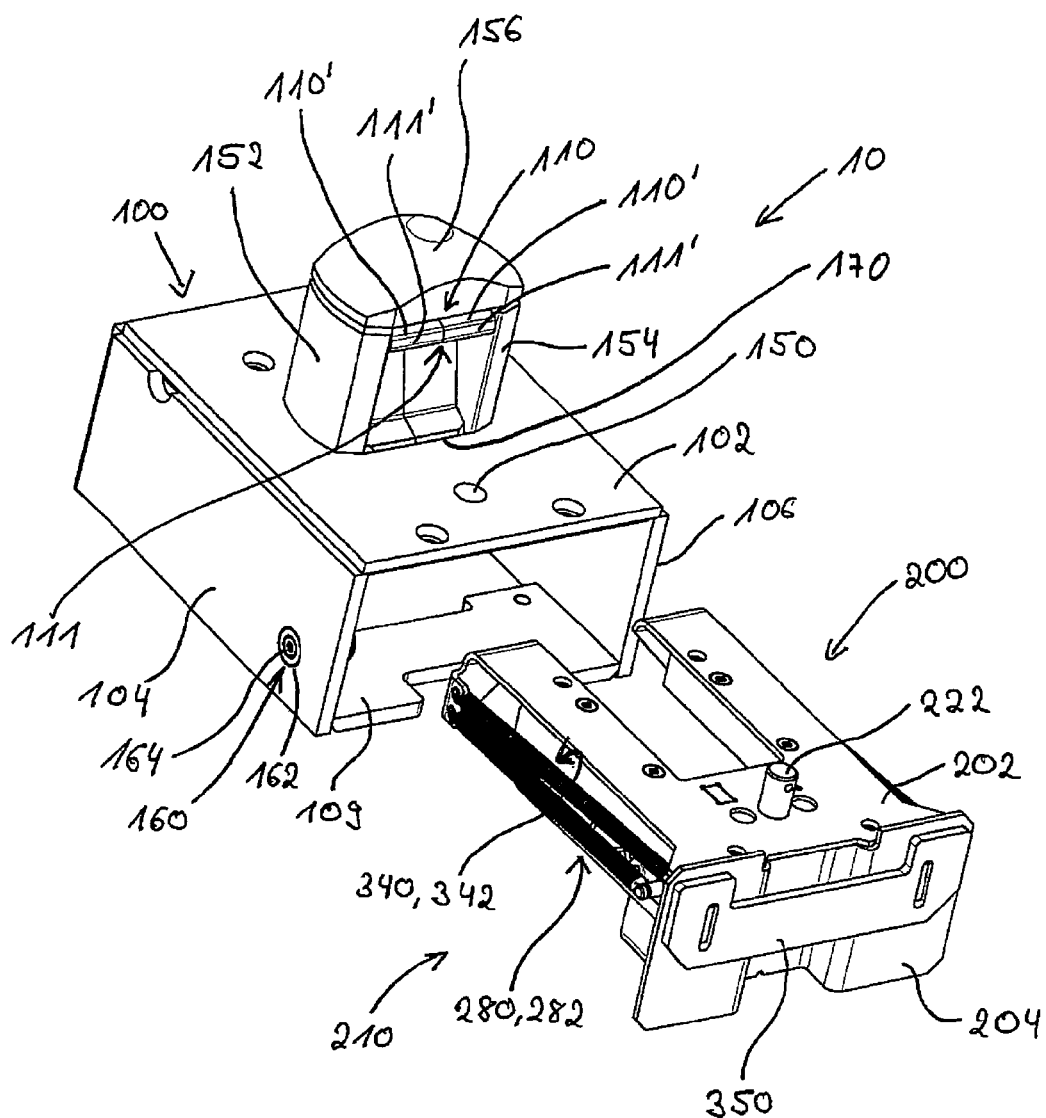

In FIG. 2, most of the components of the activation mechanism 210 are concealed. At the left side of the container lock box 200 one can see the third spring mechanism 340 in the form of a tension spring 342, being part of the manipulation mechanism 332 of the third subassembly 330. The tension spring 342 is secured to the mounting plate 202 and to the handle 350 (also see FIG. 14). Furthermore, the second spring mechanism 280 can be seen in the form of the tension spring 282, being part of the second subassembly 250, to which the second actuating element 260 belongs. The tension spring 282 is secured to the mounting plate 202 and to the second actuating element 260 (also see FIG. 14). At the right side of the container lock box 200 are also found the two tension springs 342 and 282 (see FIG. 6) which cannot be seen in FIG. 2.

In the case of the second alternative embodiment, the tension springs 282, 342 are fastened to the back wall 108 of the housing 100.

Figure 3:
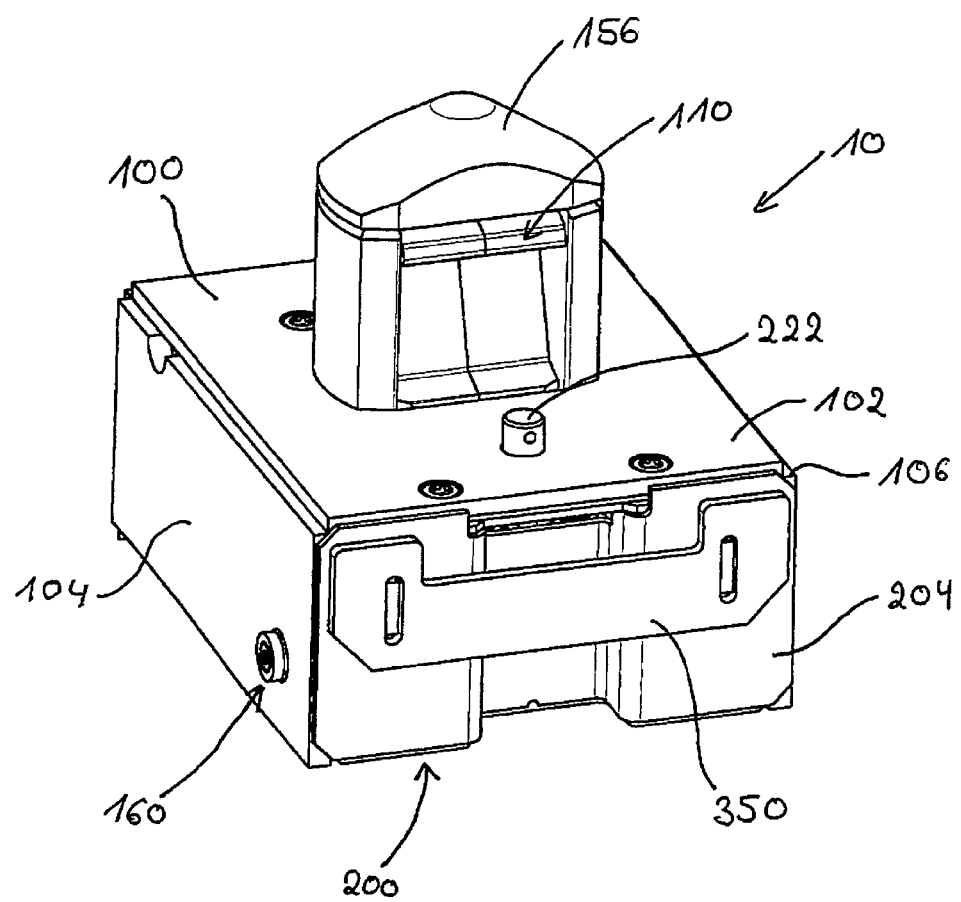

Through the mounting plate 202 there extends a release pin 222 of the release mechanism 221 in the upward direction, which projects upward through the opening 150 in the top wall 102 after being placed in the container lock housing 100, as shown in FIG. 3, which shows the locking device 10 with the container lock box 200 inserted into the container lock housing 100.

In the second alternative embodiment, the front plate 204 shown in FIG. 3 is fastened to the housing walls 102, 104, 106.

Figure 4:
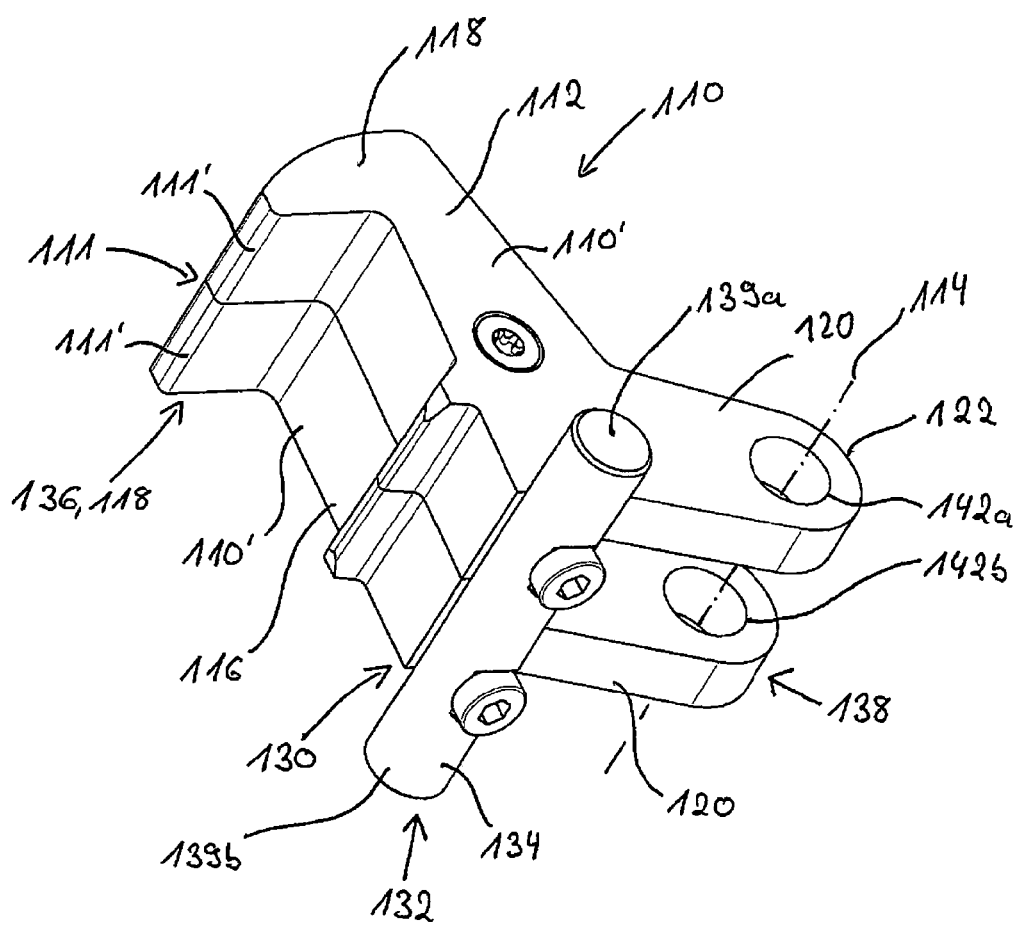

In FIG. 4 is shown the locking hook 110 in perspective view, having a hook body 112 and a hook element 111. The locking hook 110 is a two-piece hook with two hook parts 110' and two hook element parts 111' and configured as a lever with two ends 136, 138. On the first end 136 is arranged the hook element 111 and on the second end 138 of the lever is arranged the pivot axis 114. Between the two ends 136, 138 is arranged an activating means 132, which is configured as a rodlike element 134 and in the embodiment shown here it is screwed onto the locking hook 110. The rodlike element 134 projects to the side relative to the hook body 112, thus forming two journals 139a,b. The journals 139a,b can each be fitted additionally with a bearing, such as a ball bearing (not shown).

Figure 13:
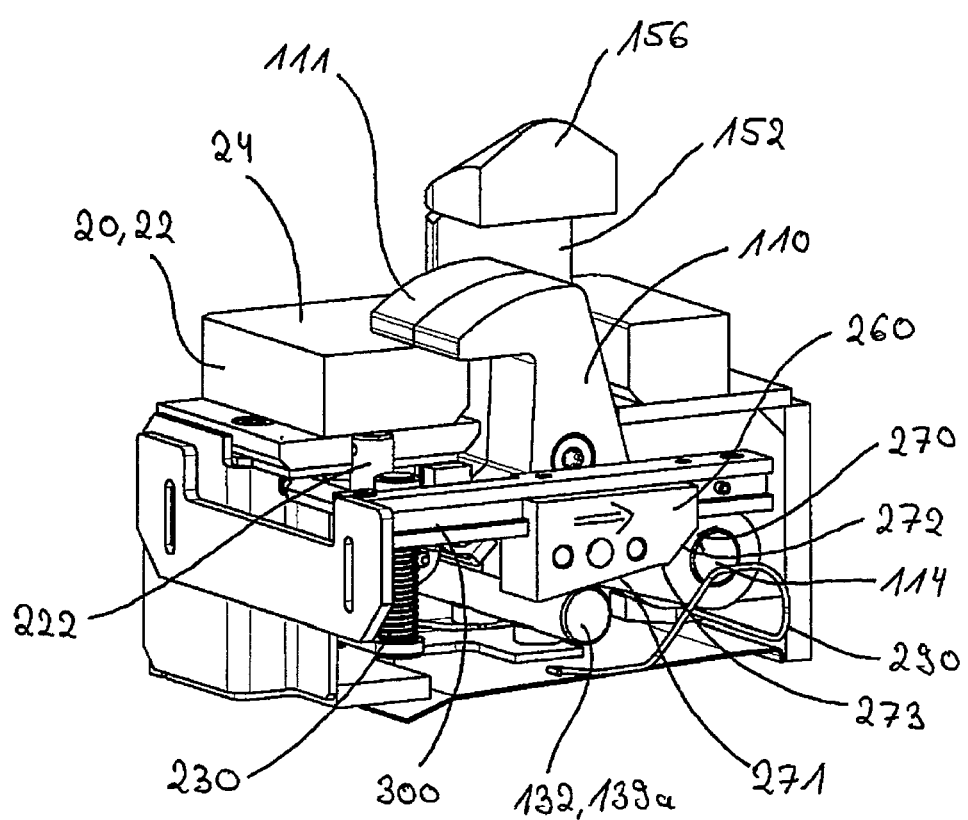

The activating means 132 works together with the first actuating element 290 and the second actuating element 260, the first actuating element 290 engaging on the underside of the journal 139a,b (see FIGS. 10 and 11) and the second actuating element 260 on the top side of the journals 139a,b (see FIG. 13).

The lever is bent. He has a first leg 116 and a second leg 120 with the free ends 118, 122, which are identical to the ends 136, 138 of the lever. In the connection region 130 of the two legs 116, 120 is arranged the activating means 132. The second leg 120 has two openings 142a,b, through which the pivot axis 114 runs and which together with the swivel support 140 and a bearing bolt 144 form the swivel support of the locking hook 110 (see FIG. 5).

The center of gravity of the locking hook 110 is at a distance from the pivot axis 114, so that the locking hook in the installed position of the locking device 10 drops by gravity from its standby position into its locking position.

Figure 5:
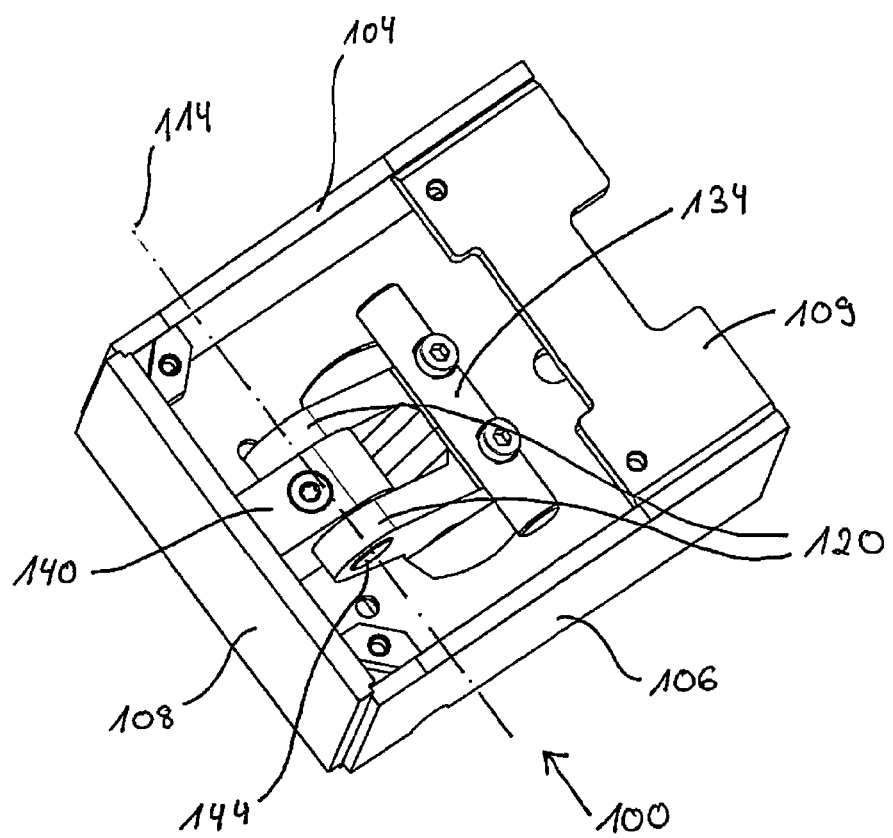

In FIG. 5 is shown the bottom view of the container lock housing 100 with mounted locking hook 110. The swivel support 140 is fastened to the back wall 108. By means of the bearing bolt 144 the second leg 120 of the locking hook 110 is mounted to pivot on the swivel support 140.

Figure 6:
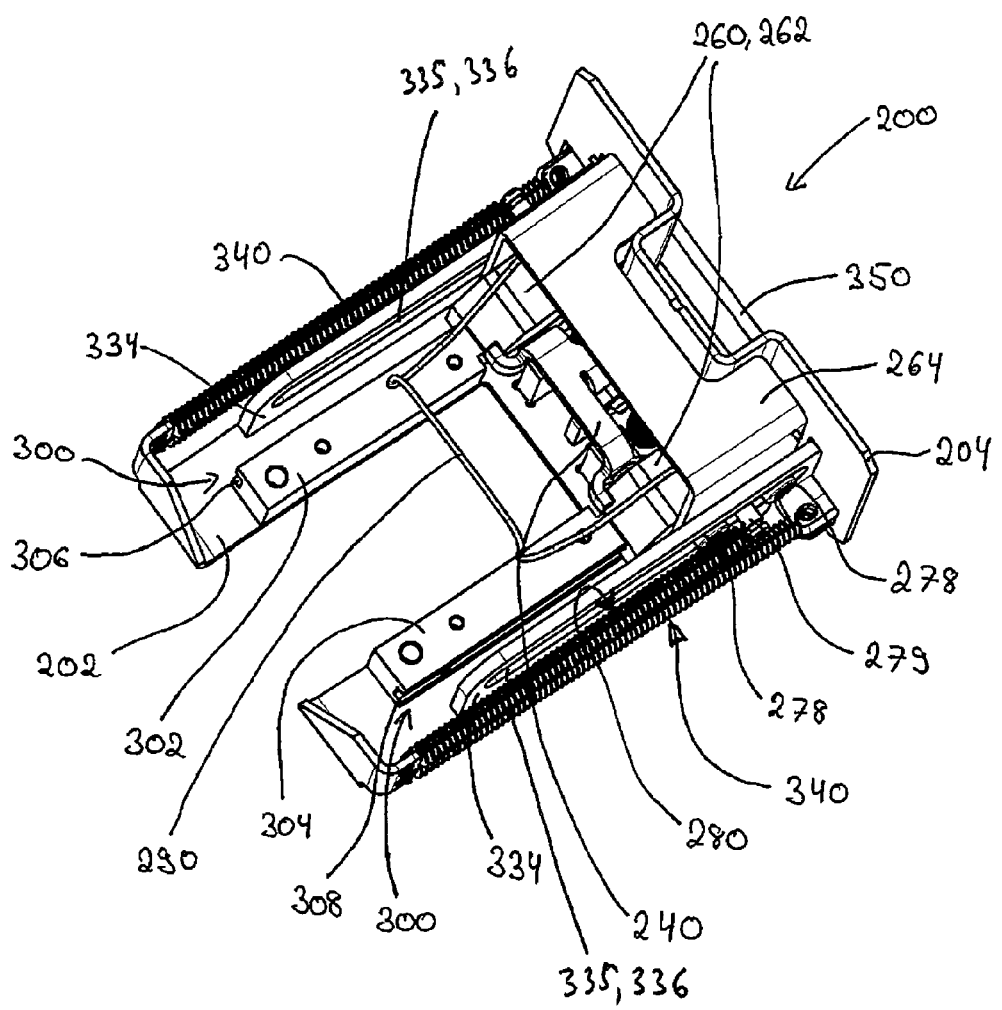

In FIG. 6 is shown the underside of the container lock box 200 with the components of the three subassemblies 220, 250 and 330. The three subassemblies are presented in detail in FIGS. 7 to 9.

The second subassembly 250 contains the second actuating element 260 (also see FIG. 8a), which consists of two wedge-shaped bars 262. The two bars 262 are joined to each other by a connection element 264 and can move in translatory manner in a linear guide mechanism 300. The linear guide mechanism 300 has two guide rails 302, 304 with grooves 306, 308, one bar 262 being led in each guide rail 302, 304. The second actuating element 260 is situated in its position of rest and can move along the guide rails 302, 304 into its blocking position.

Figure 7A:
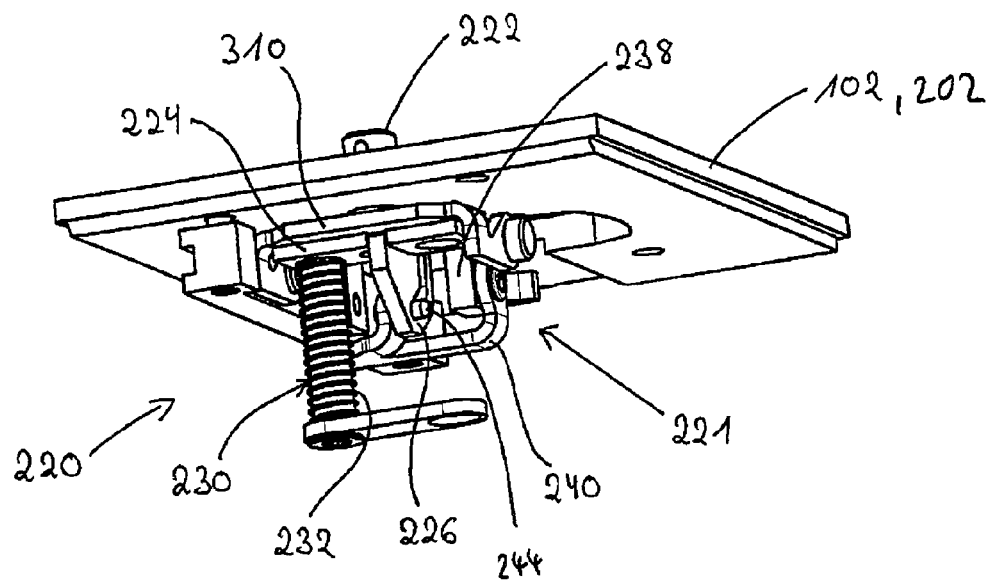

In the position of rest shown in FIG. 6, the second actuating element 260 is held by means of a detent element 240 in the form of an arrest bracket (see FIGS. 7a,b). The detent element 240 is part of the first subassembly 220, which is shown in FIG. 7a,b.

Each bar 262 is provided with a fastening pin 279, with which the second spring mechanism 280 engages, which is pretensioned and after the releasing of the second actuating element 260 it pulls the second actuating element 260 into the blocking position.

To the second actuating element 260 is fastened the first actuating element 290, which is designed as a spring element. The spring element is a wire bracket and shown in detail in FIG. 8a.

Figure 9:
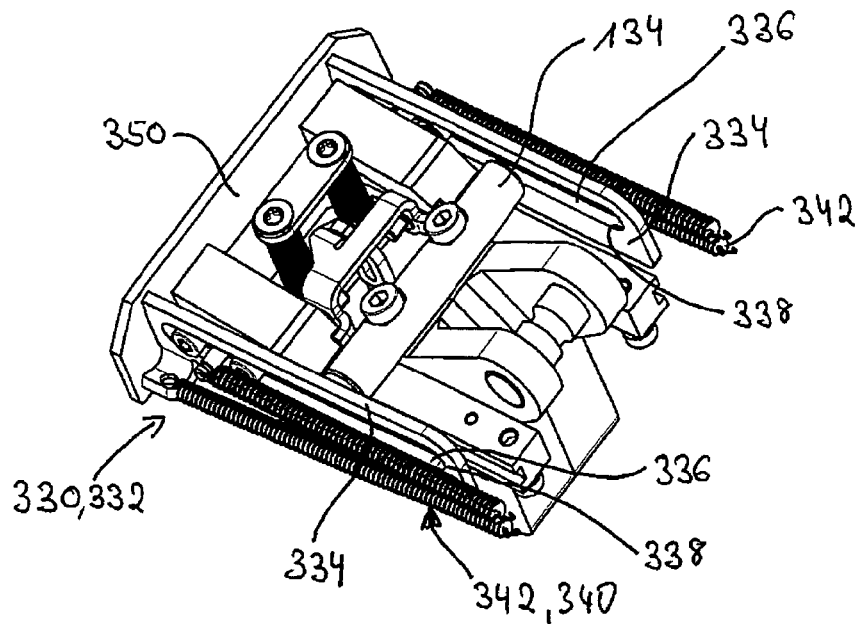

Furthermore, two guide plates 334 of the manipulation mechanism 332 of the third subassembly 330 can be seen in FIG. 6 and are shown in detail in FIG. 9. These guide plates 334 have guide tracks 335 in the form of oblong holes 336, in which screw heads 276, 278 of the second actuating element 260 are led. These guide plates 334 are fastened to the handle 350 and pretensioned by means of the third spring mechanism 340.

The linear guide mechanism 300 in the view of FIG. 6 is fastened to the mounting plate 202. According to the second alternative embodiment, the mounting plate is omitted, so that the linear guide mechanism 300 is fastened to the top wall 102.

Figure 7B:
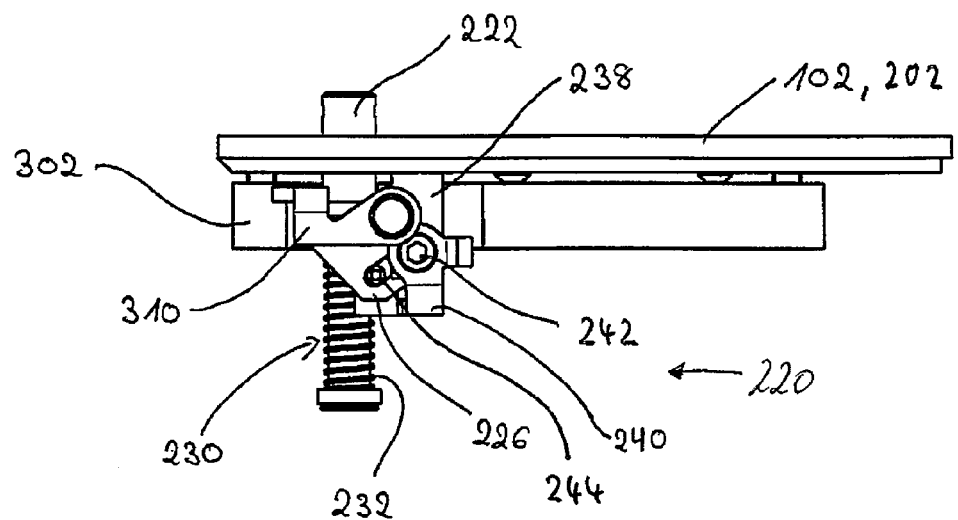

In FIGS. 7a and 7b is shown the first subassembly 220 in two views, enlarged, being arranged on the top wall 102 or alternatively on the mounting plate 202. The subassembly 220 comprises the release mechanism 221, which has the release pin 222. The release pin 222 has a slide guide 226 at its lower end, in which a pin 244 of the detent element 240 is led, so that the detent element 240 upon releasing of the release mechanism 221 can swivel in a swivel support 242 and activates the second actuating element 260 for the releasing. The detent element 240 can therefore swivel on a fastening element 238 of the release mechanism 221.

The release mechanism 221 has a first spring mechanism 230 with two compression springs 232, only one compression spring 232 being shown. The compression springs 232 hold the release pin 222 in its extended position of release.

FIG. 7b shows another view of the first subassembly 220. With the release pin 222 activated, a ratchet 310 can drop by gravity into the recesses 274 (see FIG. 8b) of the second actuating element 260 and thus hold them in the position of rest—second position of rest—despite the activating of the release pin 222. When the release pin 222 is relieved of force, the ratchet 310 is pushed by the plate 224 (see FIG. 7a) back into the starting position. The second actuating element 260 is thus released by the ratchet 310 and now slides up to the arrest bracket 240, which has once again swiveled out. The second actuating element 260 thus remains in the position of rest (first position of rest) when the release pin 222 is relieved of force.

Figure 8A:
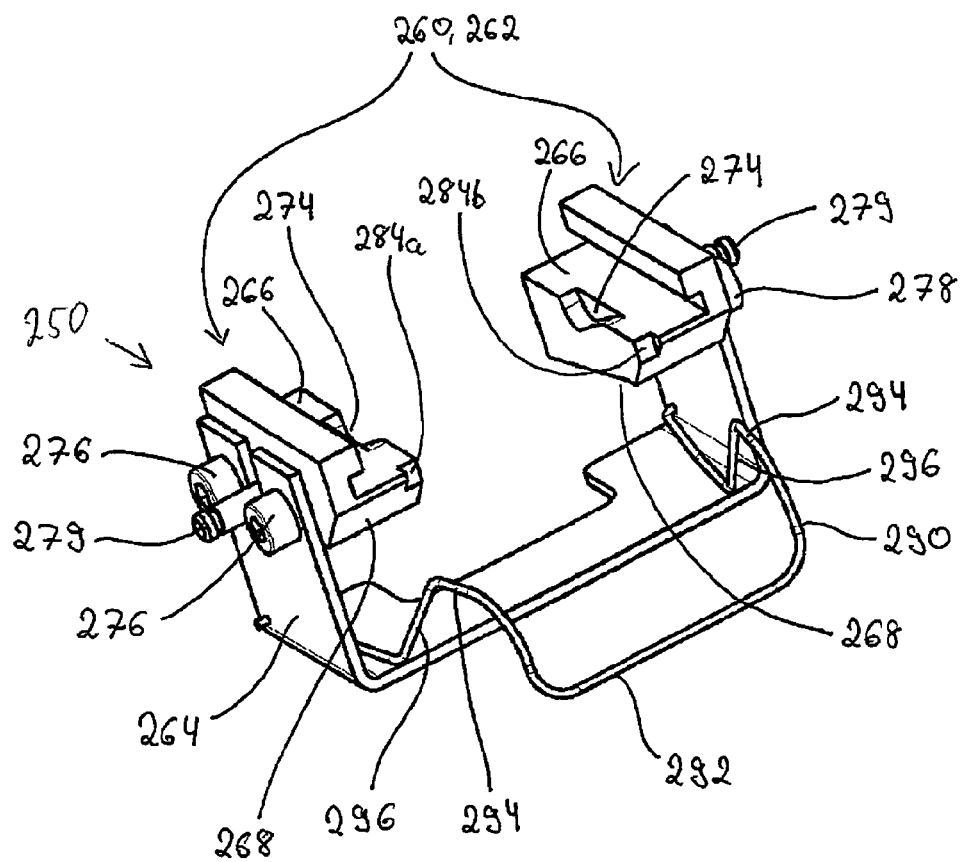

FIG. 8a shows the second subassembly 250, enlarged.

The two bars 262 of the second actuating element 260 are wedge-shaped and have a first wedge surface 266 and a second wedge surface 268. In the first wedge surface 266 there is provided a recess 274, which engages with the ratchet 310, as shown in FIG. 7b and described more closely in connection with the manipulation mechanism 332. At the front end of the bars 262 are arranged end stops 284a,b for the detent element 240.

The second wedge surface 268 has several segments, which will be described in connection with FIG. 8b. At the connection element 264 of the two bars 262 is fastened the first actuating element 290, which has two holding segments 294, being joined together by a connection segment 292. The holding segments 294 bear against the activating means 132 of the locking hook 110 when this is in the standby position (see FIG. 10). The holding segment 294 is adjoined by two release segments 296, which allow the locking hook 110 to drop into its blocking position (see FIG. 13) when the first actuating element 290 moves in the direction of the arrow.

For this purpose, the two release segments 296 are bent downward, which creates the necessary free space for the activating element 132 when the locking hook 110 is swiveled.

Figure 8B:
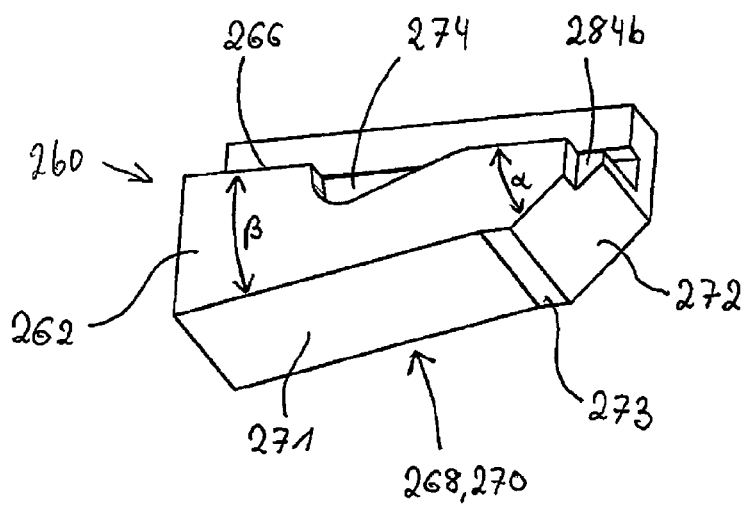

FIG. 8b shows a bar 262 in perspective view, clearly revealing the second wedge surface 268, which has a cam surface with three straight flat segments.

The segments 271 and 272 run at a slant and make with the first wedge surface 266 an angle α and β<90°, respectively. Angle β is designed so that self braking occurs. Between these two segments 271 and 272 there runs a segment 273 parallel to the wedge surface 266. This segment serves for the form fitted blocking of the locking hook 110. Segment 271 produces a power-locked blocking and clamping of the locking hook 110; segment 272 supports the locking hook in its gravity-driven movement and runs parallel to the release segments 296. Thus, the activating means 132 of the locking hook 110 can slide unhindered between the first actuating element 290 and the second actuating element 260.

FIG. 9 shows the third subassembly 330. This comprises the manipulation mechanism 332 as well as the third spring mechanism 340. The manipulation mechanism itself is composed of the guide plates 334 and the handle 350. In the guide plates there are slides or guide tracks in the form of oblong holes 336, which receive the screw heads 276 and 278 of the screws arranged on the second actuating element 260. Thanks to the tension springs 342, the manipulation mechanism is pulled into the position of rest in the container lock housing 100. When activated in the form of pulling out on the handle, the abutment 338 comes to bear against two of the screw heads 276, 278 (see also FIG. 14). This likewise moves the second actuating element 260. Thanks to the slides, the second actuating element 260 can move free of the manipulation mechanism 332, when this is in its position of rest.

Figure 10:
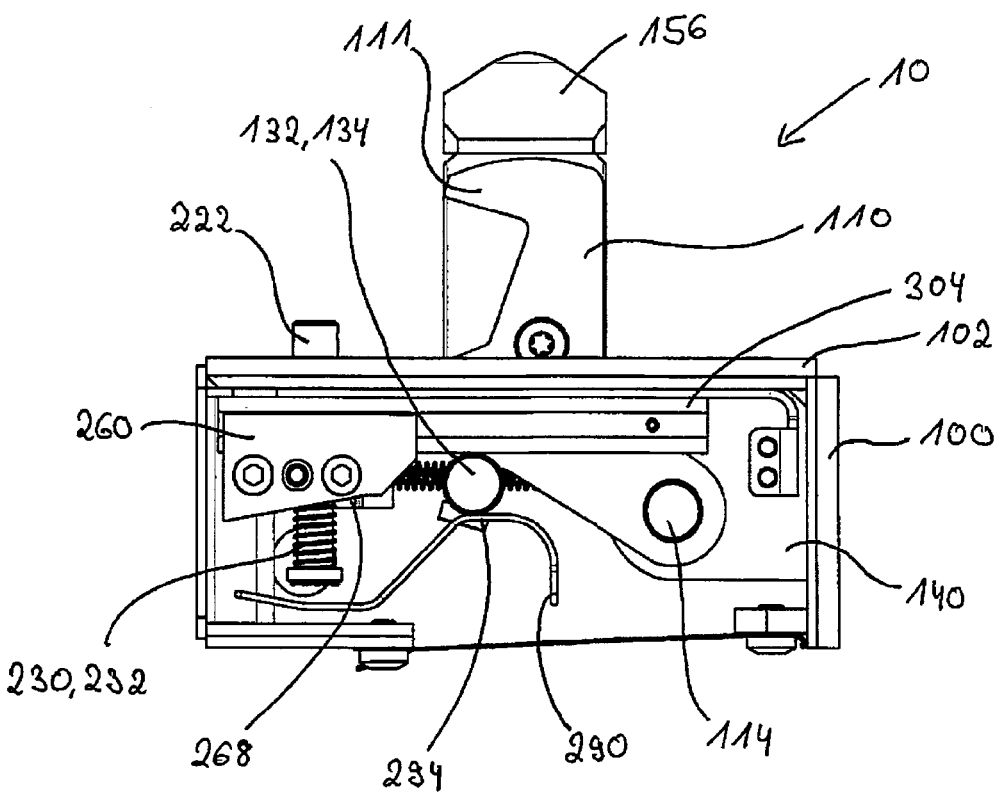

The mode of operation of the locking device 10 will be explained below by means of FIGS. 10 to 17:

FIG. 10 shows, in a side view with the container lock housing 100 opened, the locking hook 110 in its standby position, in which the locking hook 110 is held by means of the first actuating element 290. The locking hook 110 is protected beneath the bridge 156. The first actuating element 290, fashioned as a wire bracket, presses from below by its holding segments 294 against the activating means 132 of the locking hook 110. The second actuating element 260 is pretensioned in its position of rest and is held by the detent element 240, which bears against the end stops 284a,b (see FIG. 8a). The release pin 222 is pretensioned in its position of release.

Figure 11:
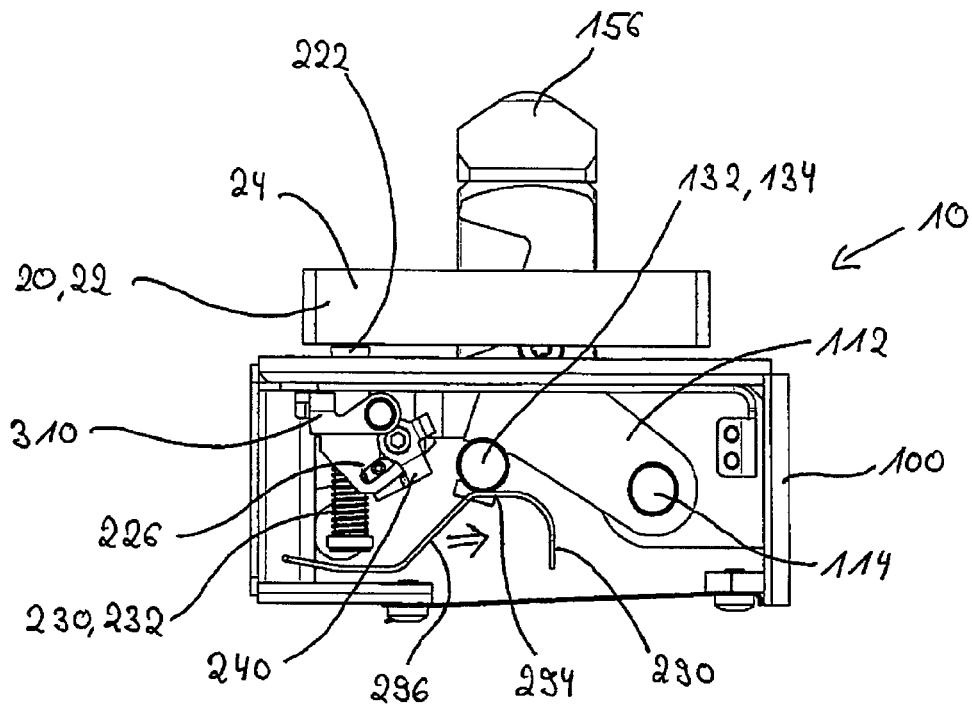
Figure 12:
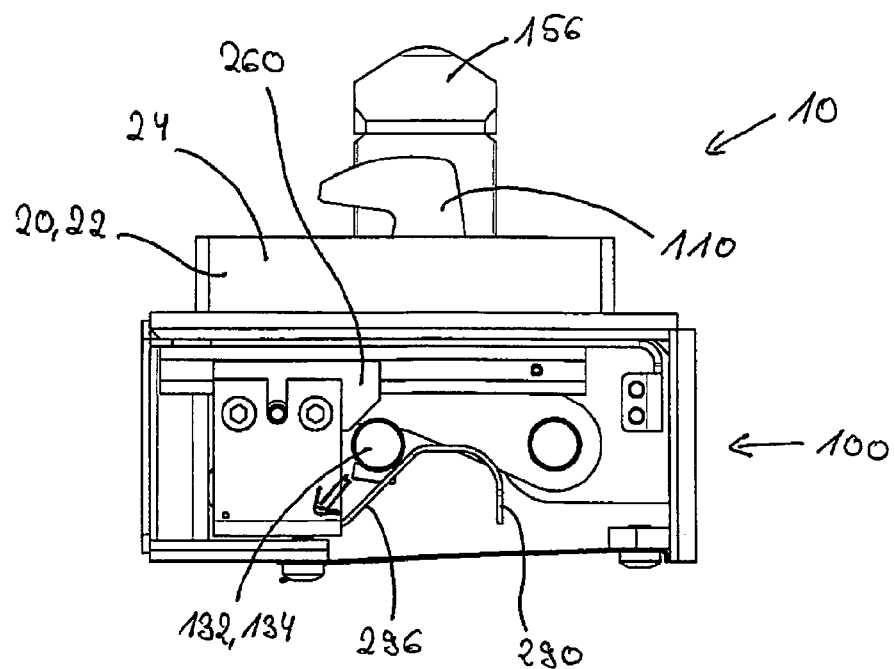

FIG. 11 shows the placing of the container 20 with its corner fitting 22, such that the release pin 222 is pressed downward against the force of the compression spring 232. The detent element 240 is swiveled upward, so that the second actuating element 260 is released. Thanks to the force of the tension spring 282, the second actuating element 260 is moved in the direction of the arrow, so that the activating means 132 is detached from the holding segment 294 of the first actuating element 290 and the locking hook 110 arrives by gravity into the region of the release segment 296, which enables a downward directed movement (see the arrow), as is shown in FIG. 12.

In this process, the segments 272 of the two bars 262 contact the activating means 132 and support the downward movement of the locking hook 110, so that the hook element 111 emerges to the left underneath the bridge 156.

The bars 262 continue to move to the right (see the arrow) until the position shown in FIG. 13 is reached. Thanks to the segment 271 of the bar 262, the activating means 132 is clamped downward, so that the hook element 111 presses against the locking surface 24 of the bottom of the corner fitting 22 and clamps the corner fitting 22.

The pin 164 of the lock indicator mechanism 160, which was previously somewhat pressed out by the connection element 264 against the force of a spring on the outside of the container lock housing 100, can now slide inward, driven by the spring, thereby indicating a locking (see FIG. 2).

Figure 14:
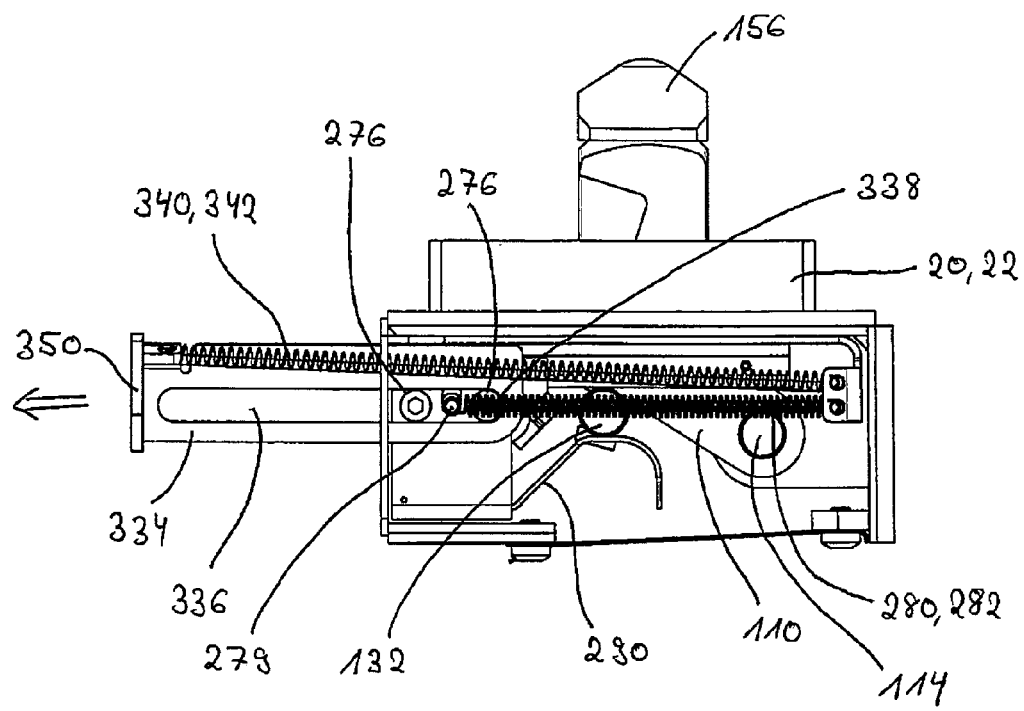

For the unlocking, the manipulation mechanism 332 of the third subassembly (see FIG. 9) is activated manually by pulling the handle 350 with the guide plates 334 out in the direction of the arrow. In this process, the screw heads 276, 278 travel to the right in the oblong holes 336 of the guide plates 334 until the right screw head 276 arrives at the end of the oblong hole 336, which thus constitutes an abutment 338. Upon further pulling out of the guide plate 334, the second actuating element 260, i.e., the bar 262, is pulled along with it. The locking hook 110 is released and at the same time lifted into its standby position by the first actuating element 290, as shown in FIGS. 14 to 16.

This opened condition is indicated by the lock indicator mechanism 160 in that the pin 164 is once again pressed by the connection element 264 in the direction of the outside of the container lock housing 100.

Figure 15:
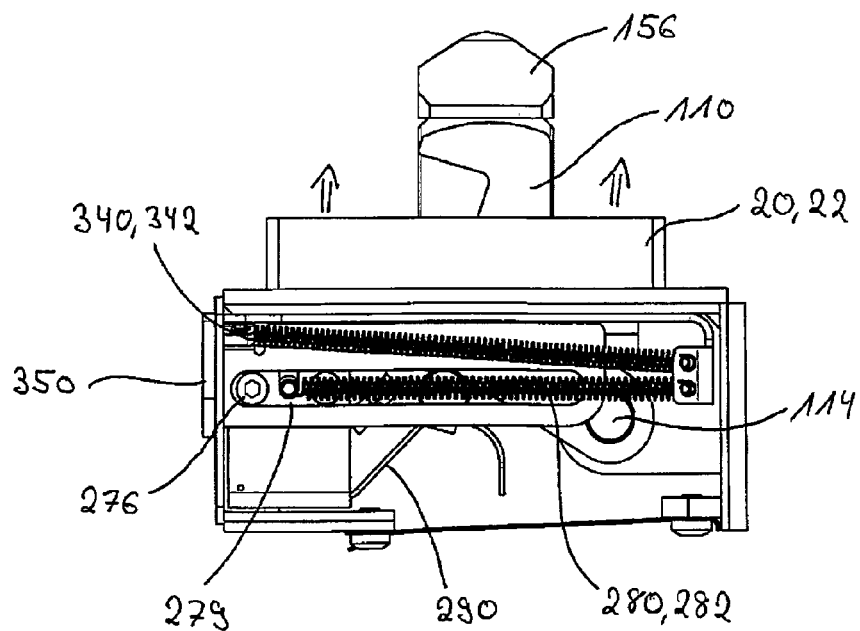
Figure 16:
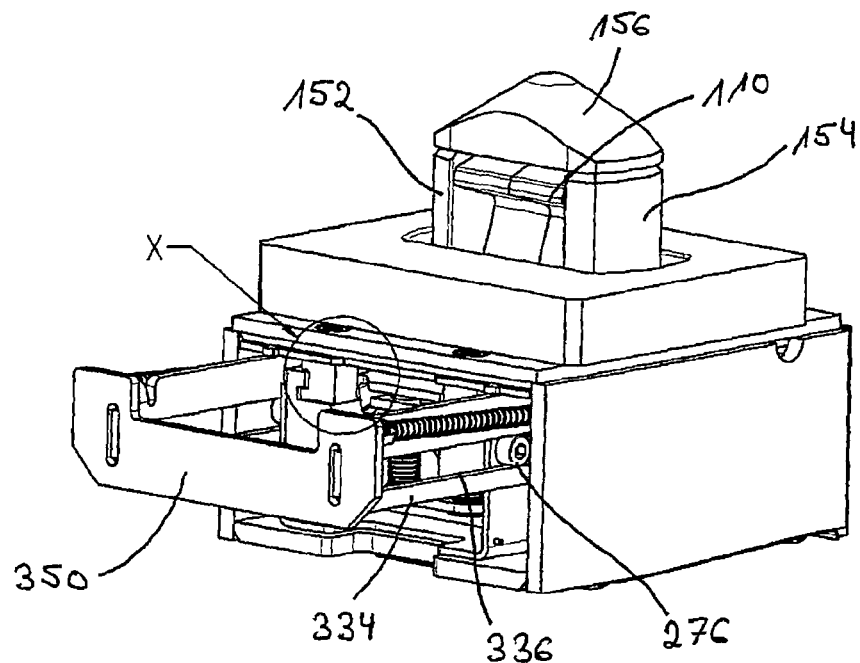
Figure 17:
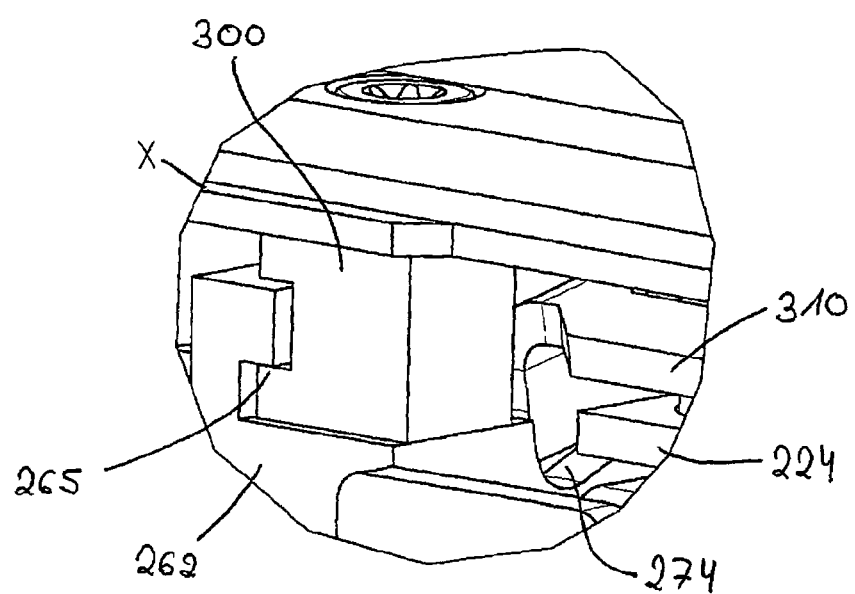

Upon releasing the handle 350, the manipulation mechanism 322 slides back into the inside of the housing (see FIG. 15). The second actuating element 260 is held in this position by the ratchet 310, having dropped into the recess 274 of the first actuating element 290 (see FIG. 17).

The container 20 can then be lifted up and removed.

FIG. 16 shows the unlocked situation, in which by pulling out the manipulation mechanism 332 the locking hook 110 has been placed in its standby position. However, if this was done unintentionally, i.e., no subsequent unloading and thus no removal of the container 20 is scheduled, the locking must be restored once again. For this purpose, the ratchet 310 with the manipulation mechanism 332 pulled out is accessible from the outside, as shown in the detail view X in FIG. 17. By manual lifting of the ratchet 310, the latter once again releases the second actuating element 260. The second actuating element 260 slides once again via the activating means 132 as in the process already described of setting down the container and restores the locking.

If the container 20 is lifted up with the locking opened, the release pin 222 will be released. After this, the arrest bracket 240 again swivels downward. Furthermore, the ratchet 310 is now pressed back into its starting position by the plate 224, so that the second actuating element 260 can slide as far as the arrest bracket. Readiness for loading the container once again has been restored.

LIST OF REFERENCE SYMBOLS 10 container locking device
12 pair of container locking devices
20 container
22 corner fitting
24 locking surface
30 semi trailer
32 loading surface
100 container lock housing
102 top wall
104 side wall
106 side wall
108 back wall
109 bottom wall
110 locking hook
110' hook part
111 hook element
111' hook element part
112 hook body
114 pivot axis
116 first leg
118 free end
120 second leg
122 free end
130 connection region
132 activating means
134 rodlike element
136 first end of lever
138 second end of lever
139a,b journal
140 swivel support
142a,b opening
144 bearing bolt
150 opening for release pin
152 guide element
154 guide element
156 bridge
160 lock indicator mechanism
162 opening for indicator mechanism
164 pin
170 opening
200 container lock box
202 mounting plate
204 front plate
210 activation mechanism
220 first subassembly
221 release mechanism
222 release pin
224 plate
226 slide guideway
230 first spring mechanism
232 compression spring
238 fastening element
240 detent element
242 swivel support
244 guide pin of detent element
250 second subassembly
260 second actuating element
262 bar
264 connection element
265 guide groove
266 first wedge surface
268 second wedge surface
270 cam surface
271 first segment of the cam surface
272 second segment of the cam surface
273 third segment of the cam surface
274 recess
276 screw head
278 screw head
279 fastening pin for spring
280 second spring mechanism
282 tension spring
284a,b end stop for detent element
290 first actuating element
292 connection segment
294 holding segment
296 release segment
300 linear guide mechanism
302 guide rail
304 guide rail
306 groove
308 groove
310 ratchet
330 third subassembly
332 manipulation mechanism
334 guide plate
335 guide track, slide
336 oblong hole
338 abutment
340 third spring mechanism
342 tension spring
350 handle

What is claimed is:

1. A locking device for containers, comprising: a container lock housing and with a locking hook that has a hook body, a hook element, and a pivot axis, which is stationary relative to the housing and about the pivot axis the locking hook can swivel into a standby position and a locking position, and with an activating mechanism for the locking hook, wherein the activating mechanism has a first actuating element, a second actuating element, and a releasing mechanism, wherein the first actuating element holds the locking hook in its standby position and the second actuating element is configured so that it blocks and clamps the locking hook in its locking position, and wherein the releasing mechanism after the releasing acts on the first actuating element and/or on the second actuating element, which automatically brings about the clamping and blocking of the locking hook in its locking position by the second actuating element.

2. The locking device according to claim 1, wherein the locking hook is a lever whose pivot axis is arranged at a first end of the lever, while the hook element is arranged at a second end of the lever.

3. The locking device according to claim 2, wherein the locking hook has an activating element between the first and the second end.

4. The locking device according claim 1, wherein the locking hook drops by gravity into the locking position in the installed position of the container locking housing.

5. The locking device according to claim 1, wherein the locking hook is pretensioned in its standby position by a spring mechanism.

6. The locking device according to claim 1, wherein the second actuating element has a cam surface, which engages with the locking hook and blocks and clamps the locking hook.

7. The locking device according to claim 6, wherein the cam surface has at least one segment for the power-locked clamping and blocking of the locking hook.

8. The locking device according to claim 6, wherein the cam surface has at least one segment for the form-fitted blocking of the locking hook.

9. The locking device according to claim 1, wherein a guide mechanism is provided in the container lock housing in which the second actuating element is movably mounted.

10. The locking device according to claim 1, wherein the second actuating element is pretensioned in the position of rest by means of a second spring mechanism.

11. The locking device according to claim 1, wherein the second actuating element can be detained in a first position of rest by means of a detent element.

12. The locking device according to claim 11, wherein that the detent element can be activated by the releasing mechanism to release the second actuating element.

13. The locking device according to claim 1, wherein the second actuating element can be held in a second position of rest by means of a ratchet.

14. The locking device according to claim 13, wherein the ratchet is accessible from the outside and can be moved manually into its release position.

15. The locking device according to claim 1, wherein a manipulation mechanism is provided with a third spring mechanism for the second actuating element.

16. The locking device according to claim 1, wherein the release mechanism has a release pin.

17. The locking device according to claim 16, wherein the release pin is pretensioned in its release position by the first spring mechanism.

18. The locking device according to claim 1, wherein a lock indicator mechanism is provided on one wall of the housing wall.

19. The locking device according to claim 18, wherein two projecting guide elements flanking the locking hook are arranged on the wall, and wherein the wall is a top wall.

20. The locking device according to claim 19, wherein the guide elements are joined to each other at their free end across a bridge.

21. The locking device according to claims 1, wherein the activating mechanism is arranged in a container lock box which can be placed in the container lock housing.

22. A container lock housing to accommodate a container lock box comprising: at least one top wall, two side walls and a back wall, and with a locking hook extending through the top wall, which has a hook body, a hook element and a pivot axis that is stationary relative to the container lock housing and about which the locking hook can swivel into a standby position and a locking position,
  wherein the pivot axis of the locking hook is disposed parallel to the top wall, and
  a swivel support is provided on one housing wall for a swiveled mounting of the locking hook.

23. A container lock box for use in a container lock housing, comprising: a mounting plate, on which three subassemblies are arranged, forming an activation mechanism for a locking hook,
  wherein a first subassembly has a release mechanism with a first spring mechanism,
  wherein a second subassembly has a first actuating element and a second actuating element able to move in parallel with the mounting plate with a second spring mechanism, and
  wherein a third subassembly has a manipulation mechanism for the first and/or second actuating element with a third spring mechanism.

24. An arrangement of locking devices according to claim 1 on a container loading surface, wherein the locking devices are arranged at an edge of the loading surface, forming opposite pairs, wherein the hook elements of each pair of devices point in opposite directions.

* * * * *